United States Patent [19]
Schoenwald et al.

[11] Patent Number: 5,566,064
[45] Date of Patent: Oct. 15, 1996

[54] HIGH EFFICIENCY SUPPLY FOR ELECTROLUMINESCENT PANELS

[75] Inventors: David S. Schoenwald, Los Gatos; Charles O. Forge, Los Altos, both of Calif.

[73] Assignee: Apple Computer, Inc., Cupertino, Calif.

[21] Appl. No.: 451,941

[22] Filed: May 26, 1995

[51] Int. Cl.$^6$ .......................... H02M 7/5387; G09G 3/10
[52] U.S. Cl. .......................................... 363/132; 315/169.3
[58] Field of Search .............................. 363/17, 98, 132; 315/160, 169.3, 239, 240, 242

[56]  References Cited

U.S. PATENT DOCUMENTS

| | | | |
|---|---|---|---|
| 4,527,096 | 7/1985 | Kindlmann | 315/169.3 |
| 4,845,489 | 7/1989 | Hormel | 340/811 |
| 4,958,105 | 9/1990 | Young et al. | 315/169.3 |
| 5,293,098 | 3/1994 | Brownell | 315/169.3 |
| 5,336,978 | 8/1994 | Alessio | 363/132 |
| 5,349,269 | 9/1994 | Kimball | 315/169.3 |

*Primary Examiner*—Matthew V. Nguyen
*Attorney, Agent, or Firm*—Richard C. Liu

[57]  ABSTRACT

Apparatus for operating electroluminescent panels. An electroluminescent panel is driven by a voltage source feeding a modified bridge driven by a pulse width modulated signal. By using a pulse frequency above the range of human hearing and a modulating signal that is a sine wave of the proper frequency for operating the panel, a sine wave is generated across the panel without requiring bulky low frequency magnetic components.

28 Claims, 7 Drawing Sheets

HIGH EFFICIENCY SUPPLY FOR ELECTROLUMINESCENT PANELS

REFERENCED APPLICATION

A portion of this application is disclosed in copending application Ser. No. 08/316,282 filed Sep. 30, 1994 entitled "Flyback Switching Power Supply with Bootstrapped Gate Drive" invented by David S. Schoenwald and having the same assignee as the instant application.

BACKGROUND OF THE INVENTION

Electroluminescent (EL) Panels are commonly used as backlights for liquid crystal displays in electronic devices. EL Panels require an alternating current (AC) drive to operate. Depending on panel size and brightness required, on the order of 60 to 120 volts at 50 to 1000 Hertz (Hz) is needed. In typical battery operated devices, this drive voltage is provided using a simple resonant inverter operating at the desired frequency, such as 200 Hz. Because these simple inverters operate at a frequency in the hundreds of cycles per second, their magnetic components must be appropriately sized for operation at that frequency, and are subsequently comparatively large. Since these inverters operate at a frequency well within the range of human hearing, they commonly produce acoustic noise during operation that users find quite irritating. The output of a typical inverter is also nonsinusiodal, with the simplest producing sawtooth or square wave outputs. This results in lower operating efficiency for the overall backlighting system, and can result in shorter backlight life. Other typical drive systems are described in Kindlmann U.S. Pat. No. 4,527,096, and Alessio U.S. Pat. No. 5,336,978. The drive systems disclosed in these patents are in the form of full bridge switching circuits. They do not produce a sinusoidal drive voltage across the EL panel, and require complex and expensive level shifters to operate high side switches. What is needed is a drive system for EL panels that is small, efficient, does not produce audible noise, does not require level shifters or high side switching, and produces a sinusoidal drive voltage across the EL panel.

SUMMARY OF THE INVENTION

An improved high efficiency supply for electroluminescent panels in which a high voltage DC source feeds a modified bridge topology. One side of the bridge is a capacitive voltage divider. The other side of the bridge consists of transformer coupled switches; the EL panel is connected between the capacitive divider and the switches. The switches are driven by a pulse width modulated waveform that results in a sine wave drive signal across the EL panel.

Other objects, features, and advantages of the present invention will become more fully apparent from the following detailed description of the preferred embodiment, the appended claims, and the accompanying drawings.

DETAILED DESCRIPTION OF THE INVENTION

Electroluminescent (EL) panels used as backlighting for liquid crystal displays in electronic equipment require an alternating current (AC) drive. While the current required is low, on the order of 5 to 15 milliamps (mA), the voltage is on the order of 60 to 120 volts, and should be between 50 and 1000 cycles per second (Hz). At these drive levels, EL panels present a capacitive load to the supply. For optimum light generation and maximum EL panel life, the drive voltage should be a sine wave. While EL panels are fairly forgiving and will operate over a broad range of voltages, frequencies, and drive waveforms, optimum efficiency for a panel will be obtained with sine wave drive at a particular combination of voltage and frequency.

For example, a typical EL panel such as the Toshiba ELYG120H, measuring 80 mm by 120 mm produces a brightness of 56.3 Nits when driven by a source of 64 volts AC at 400 Hz, drawing 8.1 mA. Under these conditions, this EL panel may be characterized as an 8 kOhm impedance load, comprising a 50 nanofarad capacitance in parallel with a 37 kOhm resistance; a highly reactive load.

Figure 1:
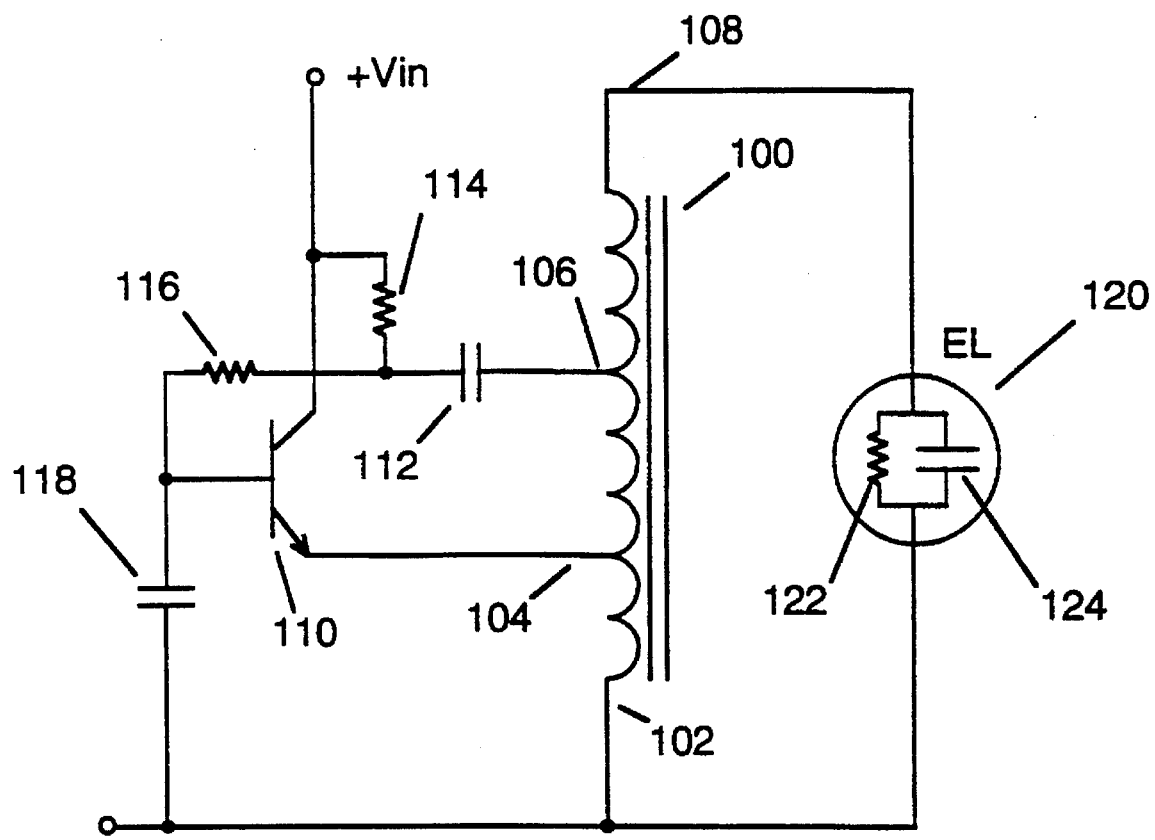
FIG. 1 is the schematic diagram of a typical resonant EL inverter.

FIG. 1 is the schematic of a typical resonant inverter for operating electroluminescent (EL) panels. This inverter operates at a frequency around 400 Hz, and produces a nonsinusiodal output which operates EL panel 120. EL panel 120 is represented by capacitive component 124 and resistive component 122. In operation, inductor 100 operates as an autotransformer, which has common primary and secondary windings. EL panel 120 is connected from common terminal 102 to output terminal 108. The emitter of switching transistor 110 is connected at terminal 104, and base drive is provided from terminal 106 through blocking capacitor 112, bias resistor 114, and base resistor 116. Bias resistor 114 and the collector of switching transistor 110 are connected to the positive supply voltage. The operating frequency of the inverter is determined by the resonant combination of the capacitance 124 of EL panel 120 and inductance of autotransformer 100, and by feedback capacitor 118.

This simple design has a number of problems. As the inductor is used to boost the voltage at the operating frequency, it must be sized appropriately to operate at a frequency of around 400 Hz; inductor size is inversely proportional to operating frequency. This makes the inductor fairly large and heavy, which is a problem in handheld electronic devices. Because the EL panel represents a highly reactive load, and is driven with a nonsinusoidal waveform having fast rise and/or fall times, high peak currents flow through the inductor winding at not only the fundamental operating frequency, but also at harmonics through the audio spectrum. These high peak currents cause vibrations in the inductor windings and inductor core laminations, which are audible to the user and are considered highly irritating. The operating frequency of this design depends on the resonant circuit formed by the EL panel capacitance and the inductor winding. The operating voltage in this design is also not regulated, and is set through "cut and try" design by varying the turns ratio of the inductor. As component characteristics change with operating temperature and as the components age, the output voltage and frequency of this simple inverter will change. This simple design also offers no simple way to adjust the EL panel brightness.

The full bridge switching designs of Kindlmann and Alessio produce nonsinusoidal waveforms across the EL panel; these waveforms contain fast rise or fall time sections, indicating high peak currents flowing through the EL panel. Both these full bridge circuits also require high side switching; the switches on one side of the bridge are referenced to the high voltage positive supply, rather than to ground. Since the circuitry generating timing signals is referenced to ground, level shifting circuitry must be employed to couple the timing signals to the high side switches.

Figure 2A:
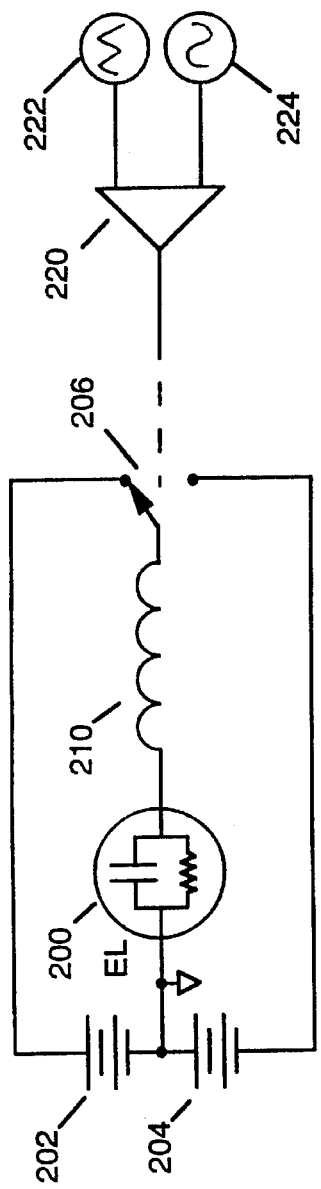
FIG. 2(a) through 2(d) show the schematic derivation of the present invention.

FIGS. 2(a) through 2(d) show the schematic derivation of the present invention. Referring first to FIG. 2(a), one side of EL panel 200 is connected to ground, the junction of DC sources 202 and 204. The other side of EL panel 200 is connected through inductor 210 to SPDT switch 206. The sides of switch 206 are connected to positive DC source 202 and negative DC source 204 as shown.

When switch 206 connects inductor 210 to positive DC source 202, the voltage on the combination of inductor 210 and EL panel 200 goes positive. When switch 206 connects inductor 210 to negative DC source 204, the voltage on a voltage divider and energy storage device, the value of capacitors 202 and 204 should be at least ten times the effective capacitance of EL panel 200. Now, as switch 206 alternates between its positions, reactive current flows between EL panel 200, inductor 210, and capacitors 202 and 204, rather than through DC source 100. If DC source 100 is a voltage source, with an output impedance deliberately made higher than the impedance of capacitors 202 and 204 at the switching frequency, the reactive current flowing through DC source 100 is minimized.

Figure 2B:
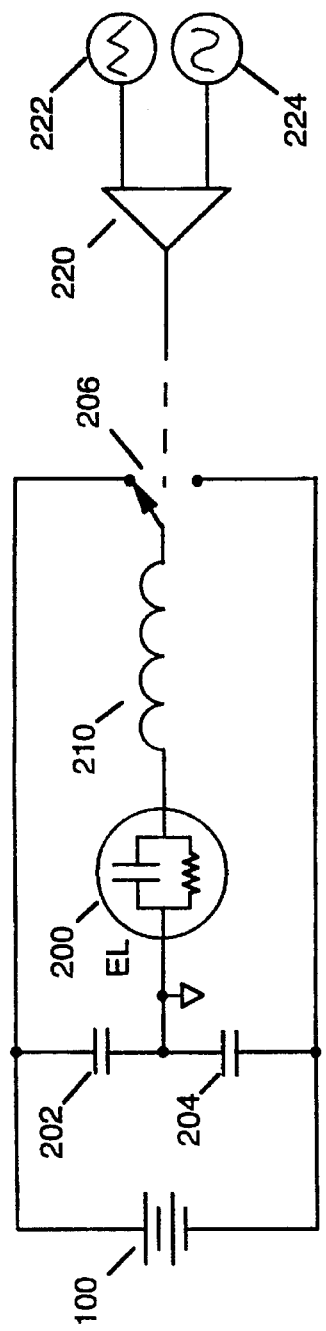
Figure 2C:
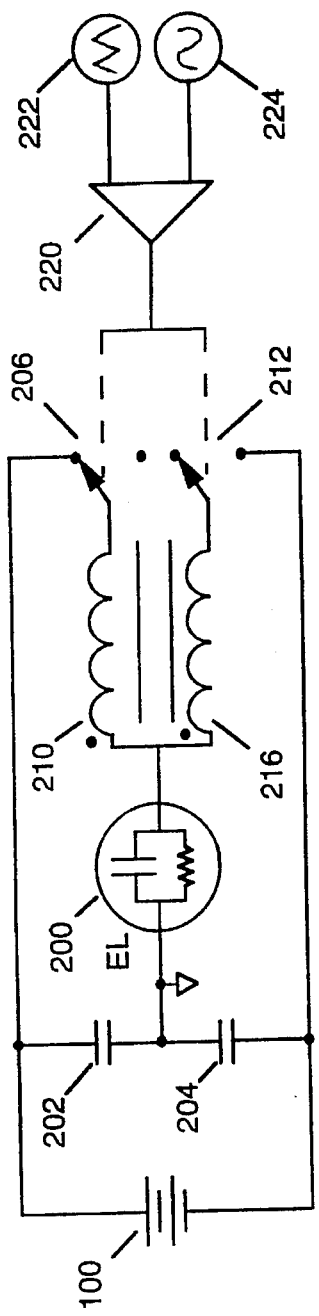
Figure 2D:
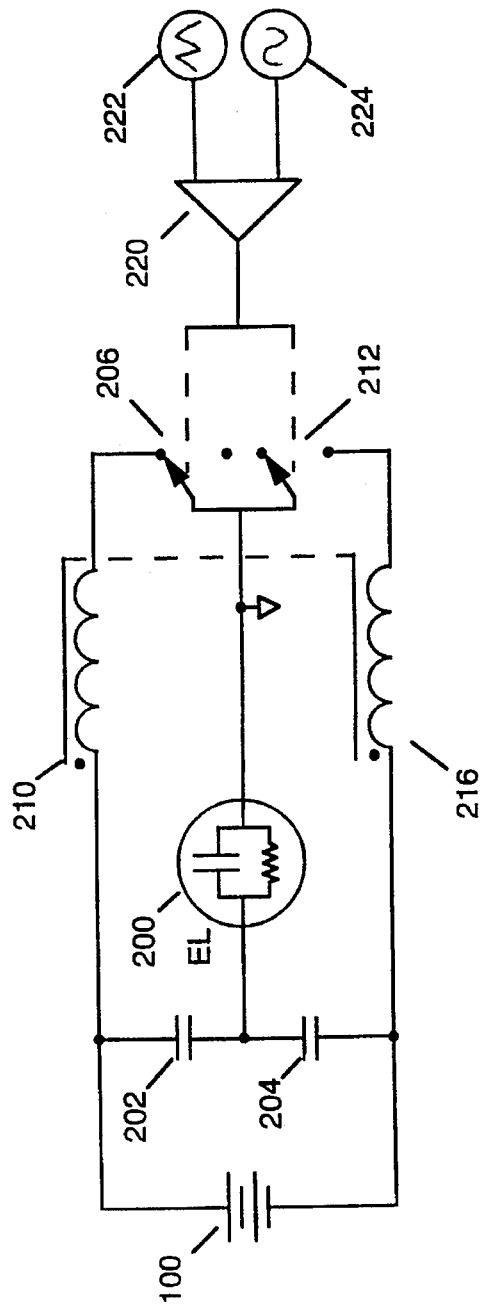

In FIG. 2(c), the single inductor and switch is replaced by a 1:1 turns ratio transformer with windings 210 and 216 phased as shown, and switches 206 and 212. When switch 206 is closed, switch 212 is open, and vice versa. FIG. 2(d) inverts the positions of the switches and transformer windings. Now, the junction of switches 206 and 212 and EL panel 200 is referenced to ground. In operation, this circuit is the same as FIG. 2(a); the pulse width modulated output of comparator 220 drives switches 206 and 212. Transformer windings 210 and 216 act as a low pass filter, resulting in a sine wave across EL panel 200.

Figure 3:
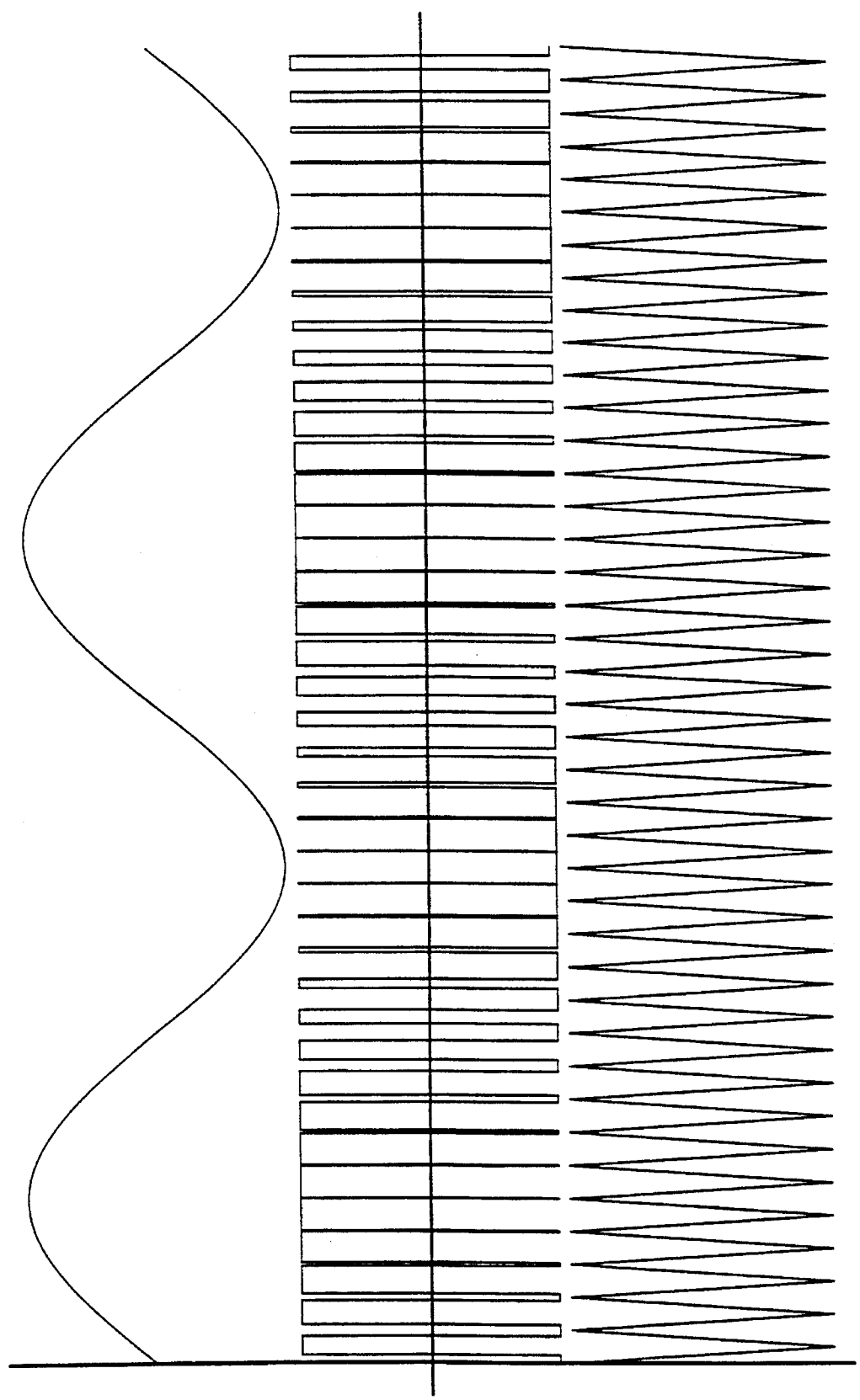
FIG. 3 shows the operation of the pulse width modulator used in the present invention.

FIG. 3 shows the operation of the pulse width modulator of the present invention as modeled using the program Mathematica produced by Wolfram Research. The Mathematica program which produced FIG. 3 is:

1| saw[t_] := 4.02 Abs[t-Floor[t] – 1/2] – 1

2| Plot[{

3| Sin[2 Pi x] + 2.1,

4| saw[20 x] – 2.1,

5| Sign[Sin[2 Pi x] – saw[20 x]]}, {x, 0, 2},

6| PlotPoints –> 10000, Ticks –> None, PlotStyle –> Thickness[.001]]

inductor 210 and EL panel 200 goes negative. If switch 206 changed positions with a 50% duty cycle, half the time connected to positive DC source 202 and half the time connected to negative DC source 204, the voltage across EL panel 200 would be zero. The effective voltage across EL panel 200 is therefore a function of the duty cycle of switch 206.

Triangle source 222 and sinewave source 224 feed comparator 220 to form a pulse width modulator. In the present invention, triangle source 222 has an operating frequency in the range of one thousand Hertz (1 KHz) to one hundred thousand Hertz (100 KHz). The frequency of triangle source 222 can be as low as several times the frequency of sinewave source 224, it should be above the range of human hearing to reduce acoustic noise. Sinewave source 224 has an operating frequency of 50 Hz to 1000 Hz. The resulting output of comparator 220 is a pulse train with the frequency of triangle source 222 which is pulse width modulated by sinewave source 224.

When switch 206 is controlled by the output of comparator 220, inductor 210 acts as a low pass filter, and the resulting voltage waveform across EL panel 200 is a sine wave with the frequency of sinewave source 224. The higher the frequency of triangle source 222 with respect to sinewave source 224, the lower the value of inductor 210 needed to be an effective low pass filter, producing a clean sine wave with little ripple across EL panel 200.

DC sources 202 and 204 of FIG. 2(a) are replaced by a single DC source 100 and the voltage divider formed by capacitors 202 and 204 in FIG. 2(b). To function properly as In the program above, line 1 defines triangle source 222. Lines 2 through 6 produce the waveforms. Line 3 plots sine source 224, the top waveform in FIG. 3. Line 4 plots triangle source 226, the bottom waveform in FIG. 3. Line 5 plots the output of comparator 220, the middle waveform of FIG. 3. Line 6 consists of options for drawing the figure. The middle waveform of FIG. 3, modeling the output of comparator 220, shows the pulse width modulated waveform with pulse width determined by the low frequency sine wave. FIG. 3 shows triangle source 222 operating at 20 times the frequency of sine source 224.

Figure 4:
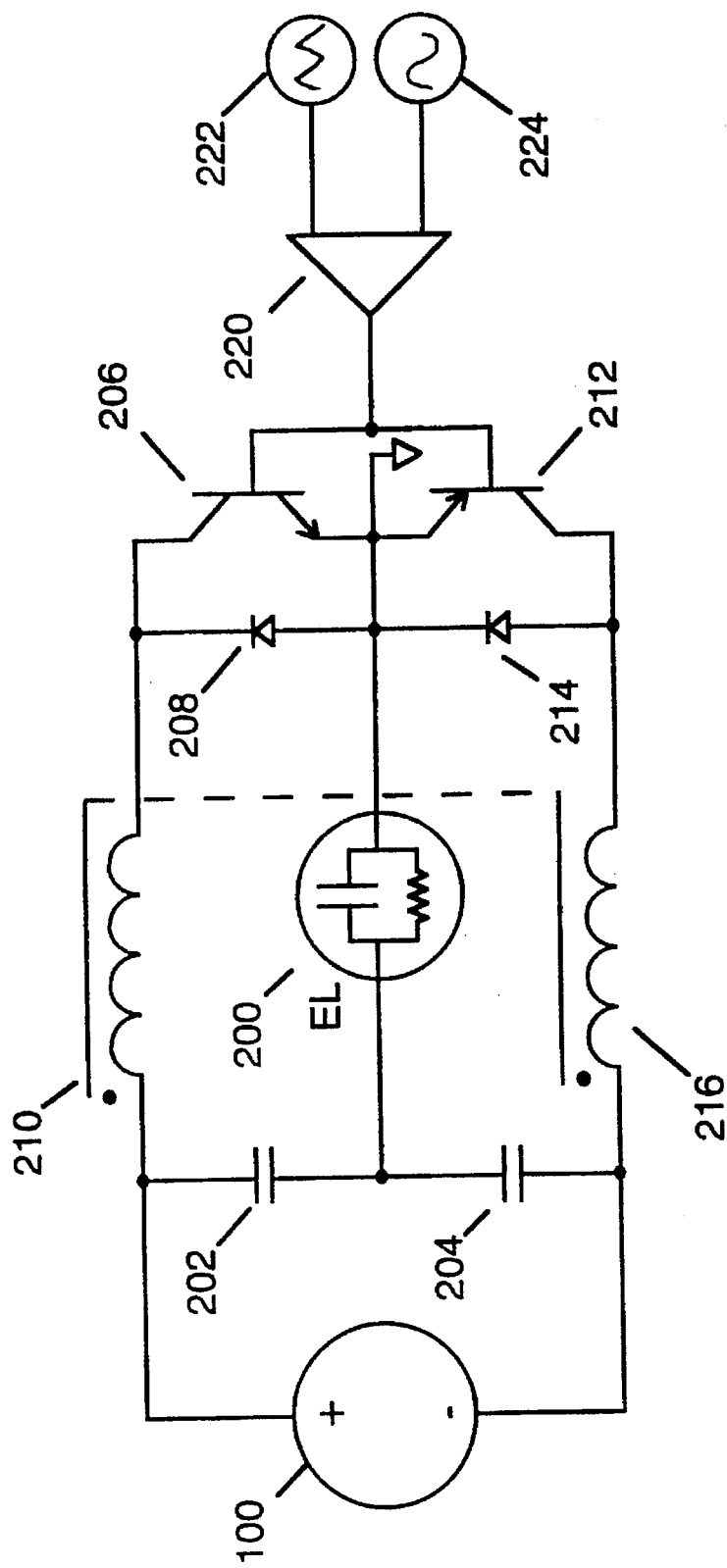
FIG. 4 is a schematic of a first embodiment of the present invention.

The block diagram of FIG. 4 shows a first embodiment of the current invention. High Voltage DC supply 100 provides a DC drive voltage. Capacitors 202 and 204 form a capacitive voltage divider. One side of EL panel 200 is connected to the junction of these capacitors. The other side of EL panel 200 is referenced to ground, and to switches 206 and 212. The positive end of DC supply 100 and the top of capacitor 202 is switched to ground through inductor 210, diode 208, and NPN switching transistor 206. The negative end of DC supply 100 and the bottom of capacitor 204 are switched to ground through inductor 216, diode 214, and PNP switching transistor 212. The bases of switching transistors 206 and 212 are connected together and driven by comparator 220. Comparator 220 is driven by triangle source 222 and sinewave source 224. Diodes 208 and 214 operate as catch diodes.

In the embodiment of FIG. 4, capacitors 202 and 204 are 1 microfarad. Transformer windings 210 and 216 are 50 millihenries, with phasing as shown by the dots. Diodes 208 and 214 can be any silicon diode with sufficient PIV rating; 1N4001 diodes are used in the embodiment shown. NPN switching transistor 206 and PNP switching transistor 212 must be relatively fast high voltage transistors. In the embodiment shown, a 2SA1575 NPN, and a 2SC4080 PNP transistor from Sanyo Electric are used. Suitably fast field effect transistors may also be used, but FETs commonly have higher drive capacitance and are less efficient. One section of a National Semiconductor LM339 comparator is used for comparator 220. Triangle source 222 and sinewave source 224 may be constructed in many ways known to the art. Sinewave source 224 sets the operating frequency for EL panel 200, and should be in the range of 60 to 1000 Hz, as recommended by the EL panel manufacturer. Triangle source 222 sets the PWM chopping frequency, and should be in the range of 1 KHz to 100 KHz. DC supply 100 may be any high voltage low current supply, or a switching supply designed for the application, such as a boost converter or flyback converter. Because capacitors 202 and 204 form a voltage divider, the voltage source used for DC supply 100 must produce twice the peak voltage required to operate EL panel 200.

Figure 5:
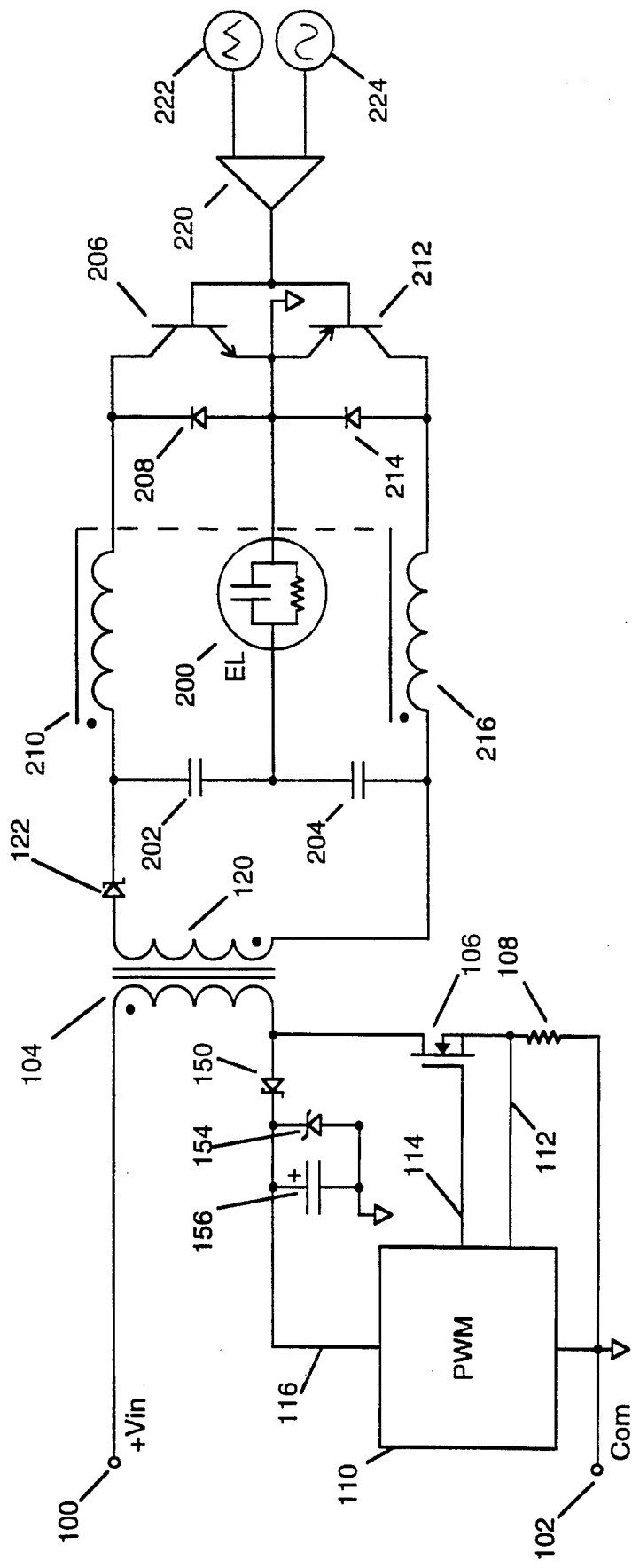
FIG. 5 is a detailed schematic of a second embodiment of the present invention.

FIG. 5 shows a detailed schematic of a second embodiment of the current invention. A high efficiency flyback supply is used to provide the DC operating voltage for the EL panel. The operation of this supply is detailed in copending application Ser. No. 08/316,282 filed Sep. 30, 1994 entitled "Flyback Switching Power Supply with Bootstrapped Gate Drive" invented by David S. Schoenwald and having the same assignee as the instant application, and incorporated by reference.

The flyback DC to DC power supply comprises secondary winding 120 and rectifier 122; primary winding 104, switch 106, sense resistor 108, and controller 110. Boosted gate drive is provided by diode 150, clamp diode 154, and capacitor 156. When power is initially applied, the voltage across capacitor 156 will be the voltage drop of diode 150 below the input voltage +Vin, still high enough to start operation. In the presence of ringing in primary winding 104, which occurs after switch 106 is turned on and then off and the magnetic field built up in primary winding 104 collapses, the positive ringing voltage added to the power supply input voltage +Vin is passed by diode 150, clamped to the value of zener diode, and stored in capacitor 156. This provides an operating voltage for controller 110 that quickly ramps up to the operating voltage of zener diode 154, higher than the input voltage +Vin, and therefore provides a higher gate drive voltage for driving switch 106. In the preferred embodiment, a 1N5243 13 volt zener diode is used for diode 154, and either a Schottkey barrier diode or a fast signal diode such as a 1N4148 or 1N914 is used for diode 150. Capacitor 156 is typically from 0.1 microfarad to 1 microfarad. The output of secondary winding 120 is rectified by diode 122, providing the high DC voltage source required to operate EL panel 200.

Figure 6:
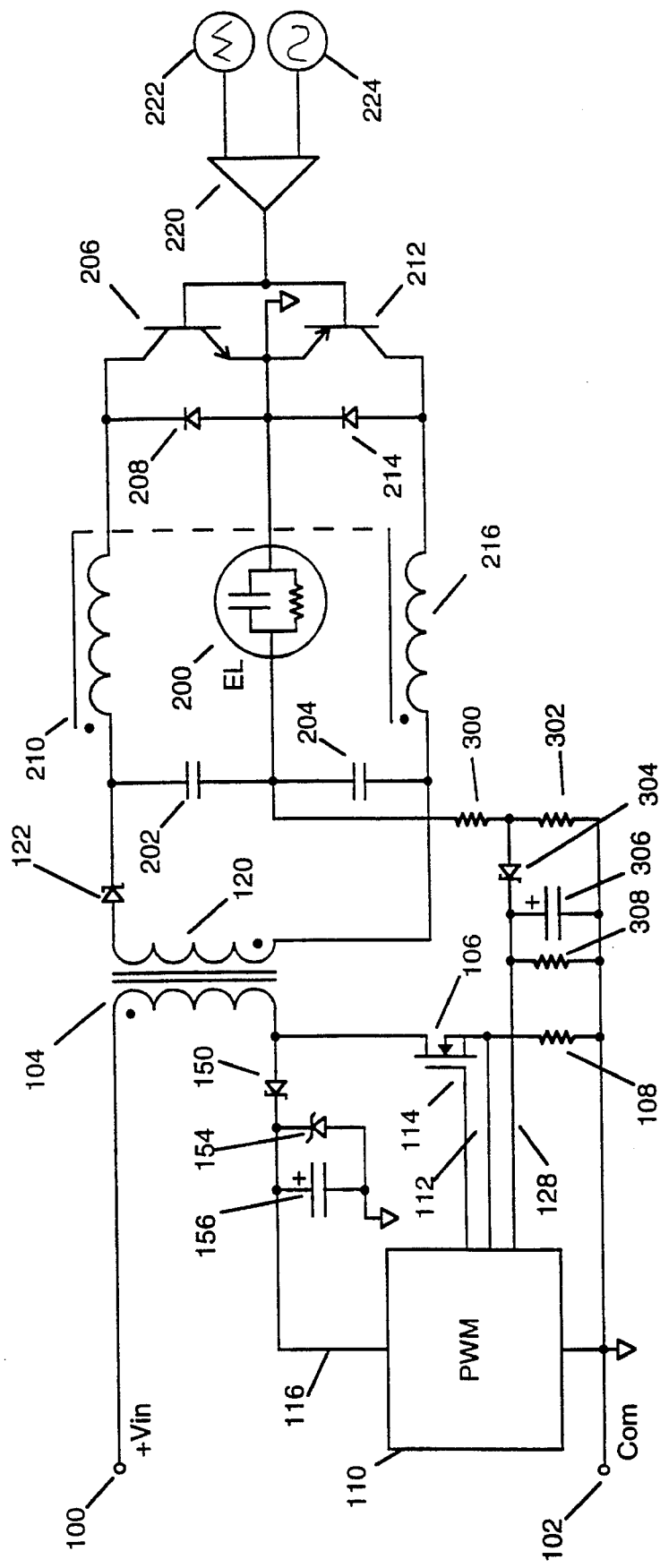
FIG. 6 is a detailed schematic of a third embodiment of the present invention.

FIG. 6 shows a detailed schematic of a third embodiment of the current invention. The fact that neither output of the high voltage DC inverter is referenced to ground seems to make regulation difficult. This embodiment of the present invention regulates the voltage across EL panel 200. In FIG. 6, the voltage across EL panel 200 is fed through a voltage divider composed of resistors 300 and 302. This voltage is rectified by diode 304 and averaged by filter capacitor 306 and resistor 308. This signal, representing the peak voltage across EL panel 200, is supplied to feedback terminal 128 on the supply PWM. A common signal diode such as the 1N4148 may be used for diode 304, since the voltage from EL panel 200 has been dropped by the divider composed of resistors 300 and 302. Capacitor 306 is approximately 0.1 microfarads. Resistor 308 improves startup performance and improves transient response. Brightness control can be obtained by replacing fixed resistor 302 with a smaller fixed resistor in series with an adjustable resistor, or with a switched resistor ladder to provide for digital control of brightness.

A similar approach may be used to sense the AC current flowing through the panel, and this current used to regulate panel operation. Panel current is sensed by opening the connection between EL panel 200 and the emitters of switches 206 and 212 and inserting a sense resistor. The voltage drop across this resistor is proportional to panel current. This voltage is rectified, for example using a circuit similar to diode 304 filter capacitor 306 and resistor 308 shown in FIG. 6, and the resulting voltage used to control PWM 110. Depending on the control sensitivity of the PWM used, a gain stage may be necessary to provide adequate voltage swing.

While the invention has been described with reference to specific embodiments, it will be understood by those skilled in the art that various changes may be made, and equivalents substituted for elements thereof, without departing from the true spirit and scope of the invention. In addition, many modifications may be made without departing from the essential techniques of this invention as defined by the following claims.

What is claimed is:

1. Apparatus for operating an electroluminescent panel comprising:

a DC source having positive and negative terminals;

first and second capacitors connected in series between the positive and negative terminals of the DC source forming a voltage divider;

a first output terminal for the electroluminescent panel connected to the junction of the first and second capacitors;

a transformer having first and second windings, each of the first and second windings having a start and an end, the start of the first winding connected to the positive terminal of the DC source and the start of the second winding connected to the negative terminal of the DC source;

first and second series connected switches, the first switch connected to the end of the first transformer winding and the second switch connected to the end of the second transformer winding;

a second output terminal for the electroluminescent panel connected to the junction of the first and second switches; and switch driving means for driving the first and second switches in complementary fashion with a pulse width modulated switching signal.

2. The apparatus of claim 1 where the second output terminal is connected to ground.

3. The apparatus of claim 1 where the pulse width modulated switching signal has a pulse rate above 1,000 cycles per second and a sine wave modulating signal in the range of 60 to 1000 cycles per second.

4. The apparatus of claim 2 where the switch driving means further comprises a comparator fed by a sine wave source and a triangle wave source.

5. The apparatus of claim 4 where the frequency of the triangle wave is above 1,000 cycles per second.

6. The apparatus of claim 4 where the frequency of the sine wave is in the range of 60 to 1000 cycles per second.

7. The apparatus of claim 1 where the DC source is a voltage source.

8. The apparatus of claim 1 where the DC source is a boost mode DC to DC converter.

9. The apparatus of claim 1 where the DC source is a flyback DC to DC converter.

10. The apparatus of claim 1 further including control means for adjusting the voltage of the DC source based on sensing the voltage across the first and second output terminals.

11. The apparatus of claim 1 further including control means for adjusting the voltage of the DC source based on sensing the current flowing between the first and second output terminals.

12. Apparatus for operating an electroluminescent panel comprising:

a first output terminal for connecting the electroluminescent panel;

first and second DC sources, the negative end of the first DC source and the positive end of the second DC source both connected to the first output terminal;

a second output terminal for connecting the electroluminescent panel;

an inductor having first and second leads, the first lead of the inductor connected to the second output terminal;

switching means connected to the second lead of the inductor, the switching means having a first position and a second position, in the first position the switching means connecting the second lead of the inductor to the positive end of the first DC source, and in the second position the switching means connecting the second lead of the inductor to the negative end of the second DC source; and switch driving means for driving the switching means with a pulse width modulated switching signal.

13. The apparatus of claim 12 where the pulse width modulated switching signal has a pulse rate above 1,000 cycles per second and a sine wave modulating signal in the range of 60 to 1000 cycles per second.

14. The apparatus of claim 12 where the switch driving means further comprises a comparator fed by a sine wave source and a triangle wave source.

15. The apparatus of claim 12 where the frequency of the triangle wave is above 1,000 cycles per second.

16. The apparatus of claim 12 where the frequency of the sine wave is in the range of 60 to 1000 cycles per second.

17. The apparatus of claim 12 further including control means for adjusting the voltage of the DC source based on sensing the voltage across the first and second output terminals.

18. The apparatus of claim 12 further including control means for adjusting the voltage of the DC source based on sensing the current flowing between the first and second output terminals.

19. Apparatus for operating an electroluminescent panel comprising:

a DC source having positive and negative terminals;

a first output terminal for connecting the electroluminescent panel;

a voltage divider connected to the positive and negative terminals of the DC source for providing half the source voltage at the first output terminal;

a second output terminal for connecting the electroluminescent panel;

an inductor having first and second leads, the first lead of the inductor connected to the second output terminal;

switching means connected to the second lead of the inductor, the switching means having a first position and a second position, in the first position the switching means connecting the second lead of the inductor to the positive end of the DC source, and in the second position the switching means connecting the second lead of the inductor to the negative end of the DC source; and switch driving means for driving the switching means with a pulse width modulated switching signal.

20. The apparatus of claim 19 where the voltage divider comprises two capacitors in series.

21. The apparatus of claim 19 where the pulse width modulated switching signal has a pulse rate above 15,000 cycles per second and a sine wave modulating signal in the range of 60 to 1000 cycles per second.

22. The apparatus of claim 19 where the switch driving means further comprises a comparator fed by a sine wave source and a triangle wave source.

23. The apparatus of claim 22 where the frequency of the triangle wave is above 15,000 cycles per second.

24. The apparatus of claim 22 where the frequency of the sine wave is in the range of 60 to 1000 cycles per second.

25. The apparatus of claim 19 where the DC source is a boost mode DC to DC converter.

26. The apparatus of claim 19 where the DC source is a flyback DC to DC converter.

27. The apparatus of claim 19 further including control means for adjusting the voltage of the DC source based on sensing the voltage across the first and second output terminals.

28. The apparatus of claim 19 further including control means for adjusting the voltage of the DC source based on sensing the current flowing between the first and second output terminals.

* * * * *